(12) United States Patent
Steadman

(10) Patent No.: US 7,076,842 B2
(45) Date of Patent: Jul. 18, 2006

(54) HOSE CLAMP ARRANGEMENT

(76) Inventor: William David Steadman, 7858 Meadowlark La., Port St. Lucie, FL (US) 34952

( * ) Notice: Subject to any disclaimer, the term of this patent is extended or adjusted under 35 U.S.C. 154(b) by 7 days.

(21) Appl. No.: 10/488,647

(22) PCT Filed: Sep. 9, 2002

(86) PCT No.: PCT/GB02/04099

§ 371 (c)(1),
(2), (4) Date: Mar. 4, 2004

(87) PCT Pub. No.: WO03/025448

PCT Pub. Date: Mar. 27, 2003

(65) Prior Publication Data

US 2004/0261228 A1    Dec. 30, 2004

(30) Foreign Application Priority Data

Sep. 14, 2001    (GB) .................................. 0122191.0

(51) Int. Cl.
*F16L 33/04*    (2006.01)
(52) U.S. Cl. .......................................... 24/21; 24/280
(58) Field of Classification Search .......... 24/279–286, 24/20 LS, 20 R, 19, 21; 285/367, 410, 419, 285/420
See application file for complete search history.

(56) References Cited

U.S. PATENT DOCUMENTS

| 700,704 | A | * | 5/1902 | Parker .......................... 217/95 |
| 2,359,418 | A | * | 10/1944 | Hartman ...................... 24/275 |
| 2,754,406 | A | * | 7/1956 | Browne ...................... 392/459 |
| 3,315,991 | A | * | 4/1967 | Davis .......................... 285/373 |
| 3,579,754 | A |   | 5/1971 | Oetiker |
| 4,128,921 | A | * | 12/1978 | Heinze et al. ................. 24/279 |
| 5,458,380 | A | * | 10/1995 | Kanao ......................... 285/369 |
| 5,488,760 | A |   | 2/1996 | Jansen |
| 6,145,896 | A | * | 11/2000 | Vitel et al. .................. 285/414 |
| 6,254,052 | B1 | * | 7/2001 | Hubbard et al. ............ 248/313 |

FOREIGN PATENT DOCUMENTS

GB          430 142 A        6/1935

OTHER PUBLICATIONS

International Preliminary Examination Report for International Patent Application No. PCT/GB02/04099.

* cited by examiner

*Primary Examiner*—James R. Brittain
(74) *Attorney, Agent, or Firm*—Watts Hoffmann, Co., L.P.A.

(57) ABSTRACT

A securing arrangement (10) suitable for e.g. strapping material together. The arrangement (10) comprising an elongate member (12) with a plurality of holes (20) along its length, formed into a loop. An L shaped securing member (14) is provided at or adjacent each end of the loop, with a respective formation (30) engaged with all other holes (20). A nut and bolt (50, 52) is engageable between the stems of the respective securing members (14) to close the loop to a required position.

16 Claims, 3 Drawing Sheets

HOSE CLAMP ARRANGEMENT

This invention concerns a securing arrangement which is especially suited to function as a hose clamp.

Securing arrangements which form bands or loops are used in a number of applications. Such applications comprise strapping together material for transportation, use in supporting trees and other plants, or the clamping together of cables, pipes or tubes etc. Existing such securing arrangements often comprise a predetermined set length or set diameter of clamp, which means different sizes are required for different purposes. This therefore often will involve a relatively large stock of arrangements being necessary to ensure that a required size of arrangement is held for a particular purpose.

According to the present invention there is provided a securing arrangement, the arrangement comprising an elongate member formable into a loop, a first securing member selectively mountable on the elongate member at or adjacent one end of the elongate member, a second securing member selectively mountable at or adjacent the other end of the elongate member, the securing members being selectively securable together to hold the elongate member in a loop.

Preferably a plurality of formations are provided along the length of the elongate member, with which formations the securing members are selectively engageable. The formations may comprise openings.

Such formations are preferably provided for substantially the whole length of the elongate member, such that the elongate member can be cut to a required length for a particular application.

An engagement formation may be provided on each securing member, selectively engageable with a respective one of the elongate member formations. Each engagement formation may comprise an inclined projection.

Each securing member preferably defines a channel through which the elongate member is slidably movable. The engagement formation is preferably provided on the base of the channel, and resilient urging means may be provided to urge the elongate member when in the channel against the engagement formation.

A securing formation may be provided on each securing member; engageable with fastening means to permit securing together of respective securing members. The securing formations may comprise through holes.

The securing member may have a generally L-shape formation, with the securing formations provided on the stem of the L. The channel may be provided on the base of the L.

The securing member may comprise two parts, a first part defining the securing formation, and a second part which defines the channel. The second part may also define the resilient urging means, and the second part may be formed of a resilient material.

An embodiment of the present invention will now be described by way of example only and with reference to the accompanying drawings, in which.

Figure 1:
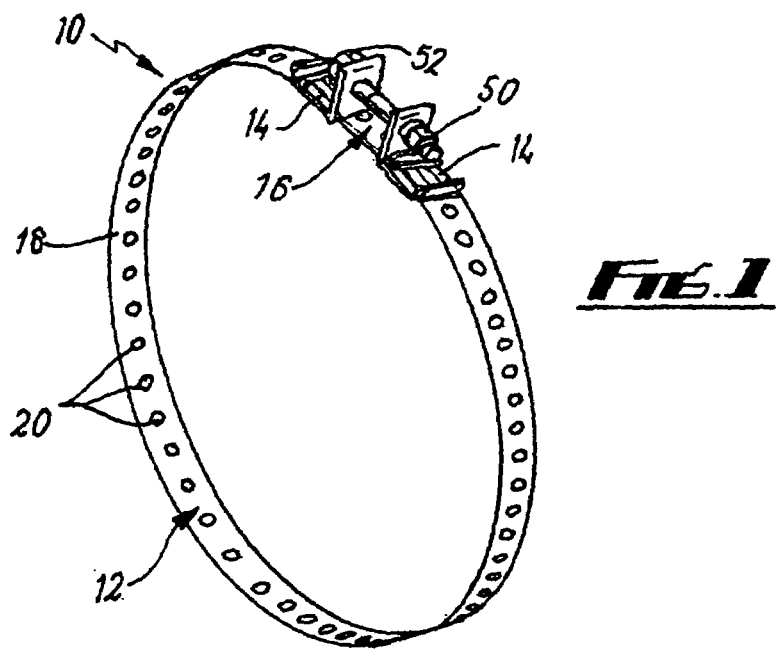
FIG. 1 is a diagrammatic perspective view of a securing arrangement according to the invention.
Figure 2:
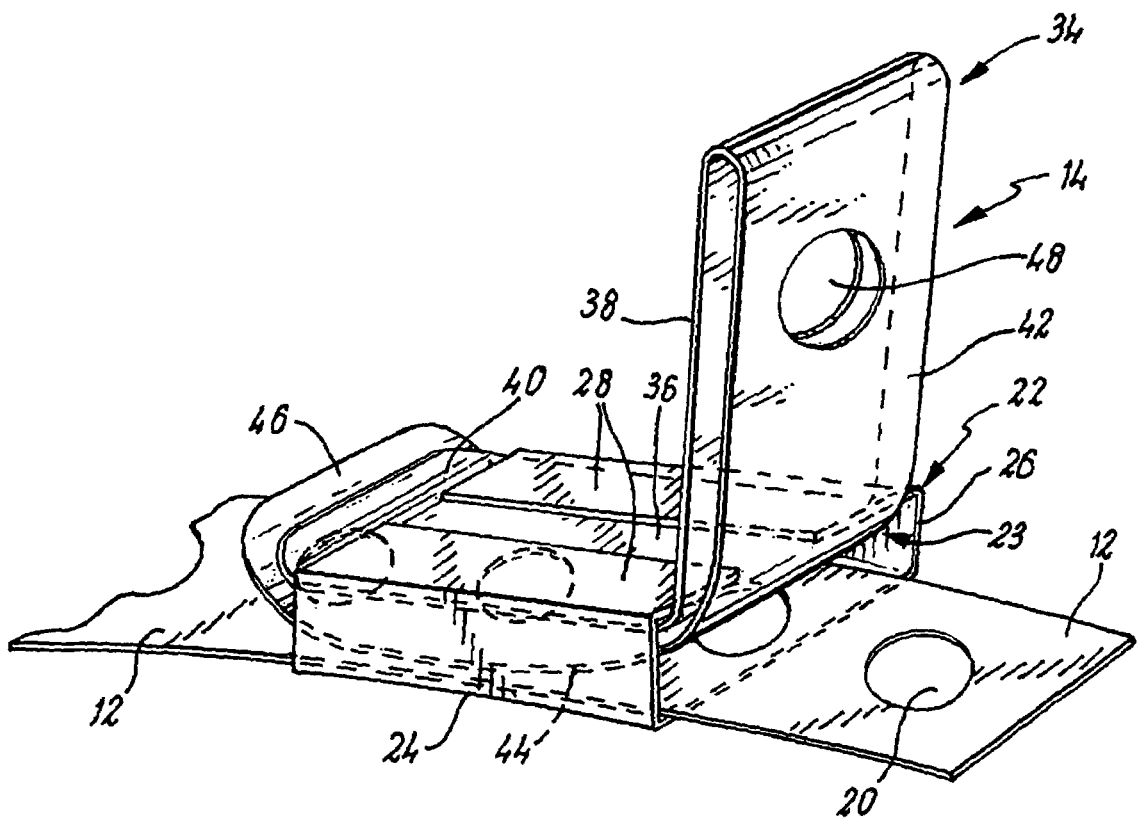
FIG. 2 is a perspective diagrammatic perspective view of part of the arrangement of FIG. 1.

The drawings show a securing arrangement 10 suitable for a wide range of applications such as a hose clamp, as a wrapping for strapping material together, mounting around a tree trunk or other plant, or securing cables, wires or tubes together or onto an item. The arrangement 10 comprises an elongate band member 12 formed into a loop. A pair of securing members or assemblies 14 are is provided each at or near the ends of the elongate member. The securing members 14 are held together by a fastening means 16 to retain the elongate member 12 in a loop.

The elongate member 12 comprises a metal strip 18 with a plurality of equally spaced through holes 20 along its length. The strip 18 can be cut to a required length for each application.

Each securing member or assembly 14 comprises two parts. The first part 22 is in the form of a channel section with a base 24, side walls 26 and inwardly turned upper walls 28 which extend only partially across. The channel 23 defined by the first part 22 is of a size for the elongate member 12 to slidably fit therethrough. An engagement formation 30 is provided on the base 24 in the form of an inclined projection 32 which is inclined upwardly to the right as shown in FIGS. 2–6. The projection 32 is formed by a generally semi-circular cut out in the base 24 which is pressed out upwardly.

Figure 4:
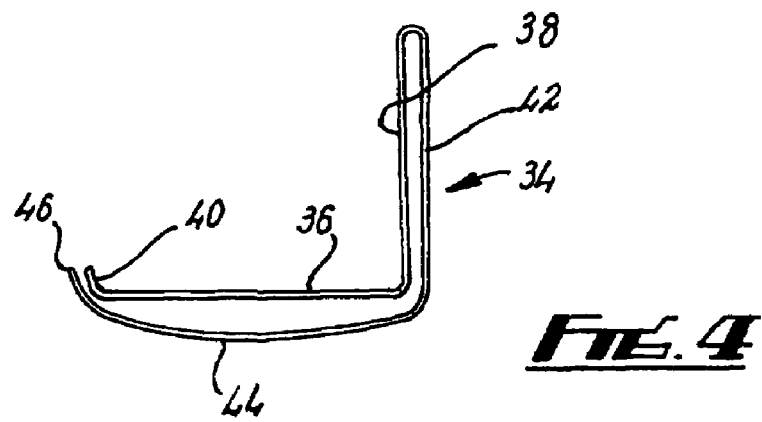
FIG. 4 is a diagrammatic side view of part of a component of the arrangement of FIG. 1.
Figure 5:
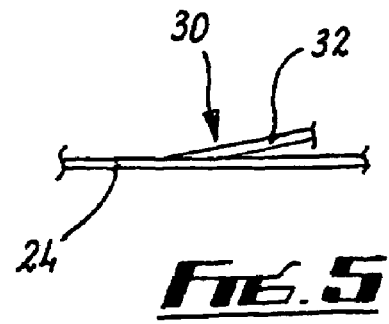
FIG. 5 is a diagrammatic cross-sectional view through a further component of the arrangement of FIG. 1.
Figure 6:
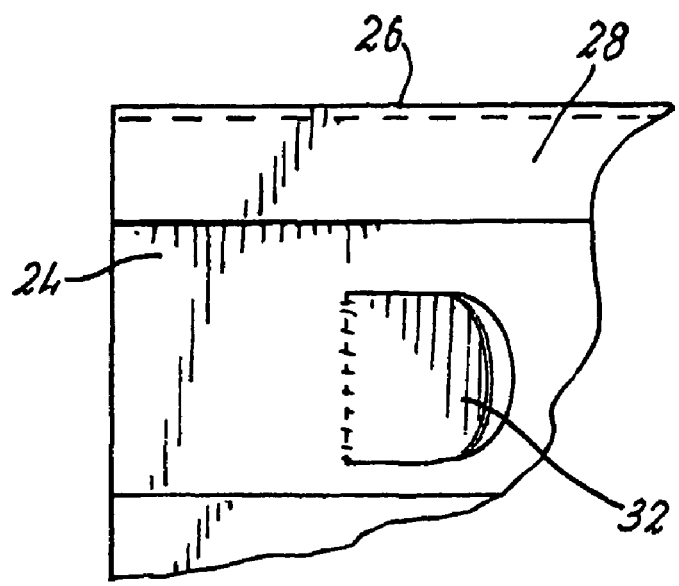
FIG. 6 is a plan view of part of the component of FIG. 5.

The second part 34 of the securing member is in the form of a double thickness generally L-shaped component (mirror image in FIG. 4). The upper skin of the L-shape has a straight base 36 and stem 38, but with an upturned lip 40 at the free end of the base 36. At the top of the stem 38 the second part 34 bends round to form the second skin of the L. The second skin again has a straight stem 42 but a downwardly bowed sprung base 44, and again an upturned lip 46. The second part 34 is formed of a resilient material such as sprung metal. Aligned holes 48 are provided through the stems 38, 42.

The first and second parts 22, 34 fit together with the bases 36, 44 engaging beneath the upper walls 28, with the stem 38 engaging against one end of the upper walls and the lip 40 engaging against the other end. The spring urging of the base 44 will engage against the base 24 or any item in the channel 23 to hold the first and second parts 22, 34 together.

In use, the elongate member 12 is cut to a required length for a particular use and bent into a loop. A securing member 14 is selected for each end of the elongate member 12 with the holes 40 on the respective securing members facing each other and the channels leading away from the other securing member 14.

Figure 3:
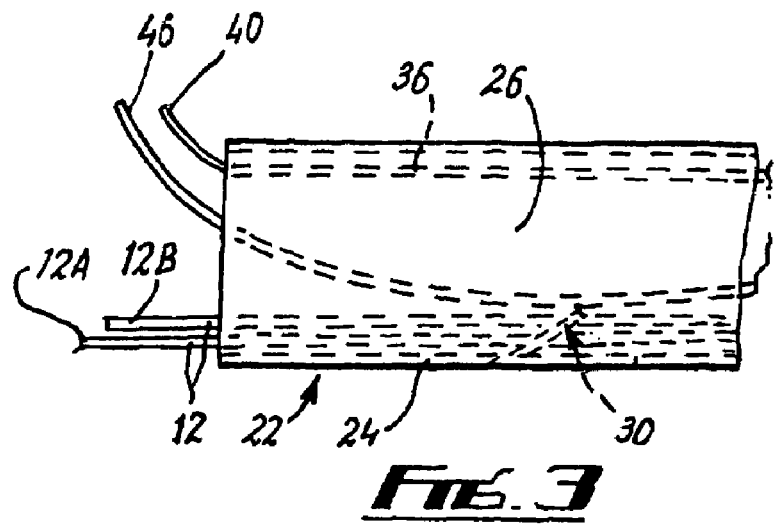
FIG. 3 is a diagrammatic side view of part of the arrangement of FIG. 1.

One end 12A of the elongate member 12 is secured to a first securing member 14 by sliding the elongate member 12 through the channel 23 (to the right as shown in FIG. 3), then pulling the elongate member 12 backwards a short distance such that the projection 32 engages in one of the holes 20. The other end 12B of the elongate member 12 is slid through the channel 23 of the other securing member 14 and probably into the channel 23 of the first securing member 14 above the one end 12A of the elongate member 12. Once the elongate member 12 is moved to a required size of loop, the other end 12B of the member 12 is moved backwards slightly in the second securing member 14 such that a respective projection 32 engages in one of the holes 20. The securing members 14 are then joined together by a fastening means 16 extending therethrough such as a nut 50 and bolt 52. The nut 50 can be tightened on the bolt thereby pulling the securing members together and closing the loop defined by the elongate member 12 to a required position.

Figure 7:
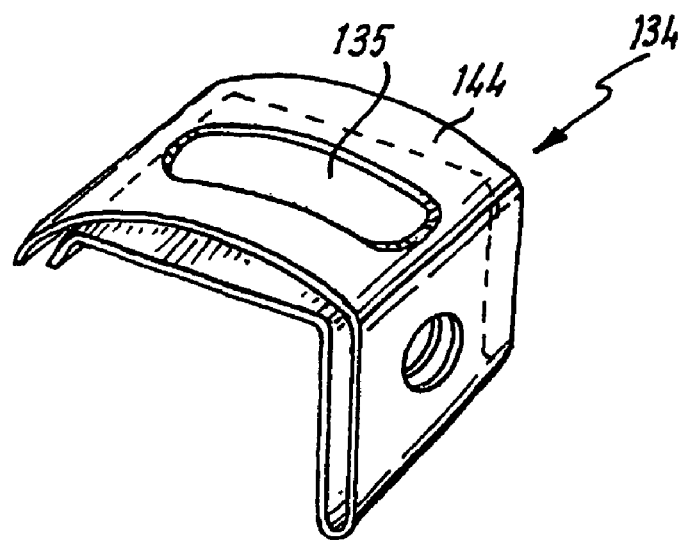
FIG. 7 is a perspective view from beneath of a modified component.

FIG. 7 shows a modified second part 134 of the securing member. The part 134 is the same as the part 34 except that a longitudinal slot 135 is provided in the base 144. The slot 135 prevents the base 144 engaging with the projection 32 engaging through a hole 20, whilst the remainder of the part 134 still urges the strip 18 against the base 24.

There is thus described a securing arrangement which readily permits a loop of a required size to be formed and held together, but which can be readily opened when required. The arrangement is of relatively simple construction and can thus be inexpensively formed but provide reliable operation. The holes along the length of the elongate member permit almost any size to be formed, and the spring urging of the securing member retains the finger in the respective hole once engaged. With this arrangement the same material can be used for a wide range of different sized loops, and it is therefore only necessary to stock a length of the elongate material end and a few securing members.

Various other modifications may be made without departing from the scope of the invention. For example, different materials may be used. Different engagement formations may be provided, and it may be that the holes in the securing member are threaded, or could for instance have a nut mounted thereto.

Whilst endeavouring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

The invention claimed is:

1. A securing arrangement comprising:
    a. an elongate member having spaced ends and being formable into a loop;
    b. a first securing member selectively mountable on the elongate member near one end of the elongate member;
    c. a second securing member selectively mountable near the other end of the elongate member;
    d. the securing members being selectively securable together to hold the elongate member in a loop; and
    e. each of the securing member mountings on the elongate member including a projection formed on a selected one of the securing members and projecting into an opening of the elongate member, said securing members having a resilient urging portion to contact said elongate member forcing said elongate member over said projection.

2. A securing arrangement according to claim 1, characterized in that openings are provided for substantially the whole length of the elongate member, such that the elongate member can be cut to a required length for a particular application.

3. A securing arrangement according to claim 1, characterized in that each engagement projection is an inclined projection.

4. A securing arrangement according to claim 1, characterized in that each securing member defines a channel through which the elongate member is slidably movable.

5. A securing arrangement according to claim 4, characterized in that each projection is provided on the base of the channel.

6. A securing arrangement according to claim 5, characterized in that each securing member includes a fastener portion, engageable with fastening means to permit securing together of respective securing members.

7. A securing arrangement according to claim 1, characterized in that each securing member includes a fastener portion, engageable with fastening means to permit securing together of respective securing members.

8. A securing arrangement according to claim 7, characterized in that each securing member has a generally L-shaped formation including an upstanding stem which includes the fastener portion.

9. A securing arrangement according to claim 8, characterized in that a channel for receipt of the elongate member is provided on the base of the L-shaped formation.

10. A securing arrangement according to claim 1, characterized in that each securing member includes a resilient urging means.

11. An endless clamp for circumscribing clamped items comprising:
    a. an elongate flexible band having spaced apertures substantially throughout its length;
    b. a spaced pair of securing assemblies each formed of a pair of interacting elements, the assemblies when in use being mounted on the band in facing and spaced relationship;
    c. a fastener interconnecting the securing members when in use for selectively drawing the securing members toward one another thereby positioning the elongate member in a ring of adjustable circumference;
    d. each assembly including a channel and an L shaped part with a leg of the L part extending when in use into the channel of the same assembly and forming a part interlocking connection, each L part having an upstanding apertured arm for receiving the fastener;
    e. one of the parts of each assembly having an engagement projection extending when in use into and engaging a wall defining one of the band apertures; and,
    f. an unturned lip and a resilient urging portion are located on said leg;
    g. whereby said interlocking connection is achieved through said upturned lip and the resilient urging portion.

12. The clamp of claim 11 wherein each engagement projection is an inclined integrally formed projection.

13. The clamp of claim 12 wherein each channel has a base and each projection is formed in the base.

14. The clamp of claim 12 wherein said one part is the channel.

15. The clamp of claim 11 wherein said one part is the channel.

16. An endless clamp for circumscribing clamped items comprising:
    a. an elongate flexible band having spaced apertures substantially throughout its length;
    b. a spaced pair of securing assemblies each formed of a pair of interacting elements, the assemblies when in use being mounted on the band in facing the spaced relationship;
    c. a fastener interconnecting the securing members when in use for selectively drawing the securing members toward one another thereby positioning the elongate member in a ring of adjustable circumference;

d. each assembly including a channel and an L shaped part with a leg of the L part extending when in use into the channel of the same assembly and forming a part interlocking connection, each L part having an upstanding apertured arm for receiving the fastener; and,
e. one of the parts of each assembly having an engagement projection extending when in use into and engaging a wall defining one of the band apertures;
f. wherein each L shaped part has a pair of apertured arms and a pair of legs extending into the channel, and wherein each L-shaped part has a biasing bend interconnecting the arms and biasing the legs when in use against the channel to secure the parts of an assembled clamp together.

* * * * *